E. A. MILLER.
BATTERY POST.
APPLICATION FILED OCT. 28, 1920.
1,434,307.
Patented Oct. 31, 1922.
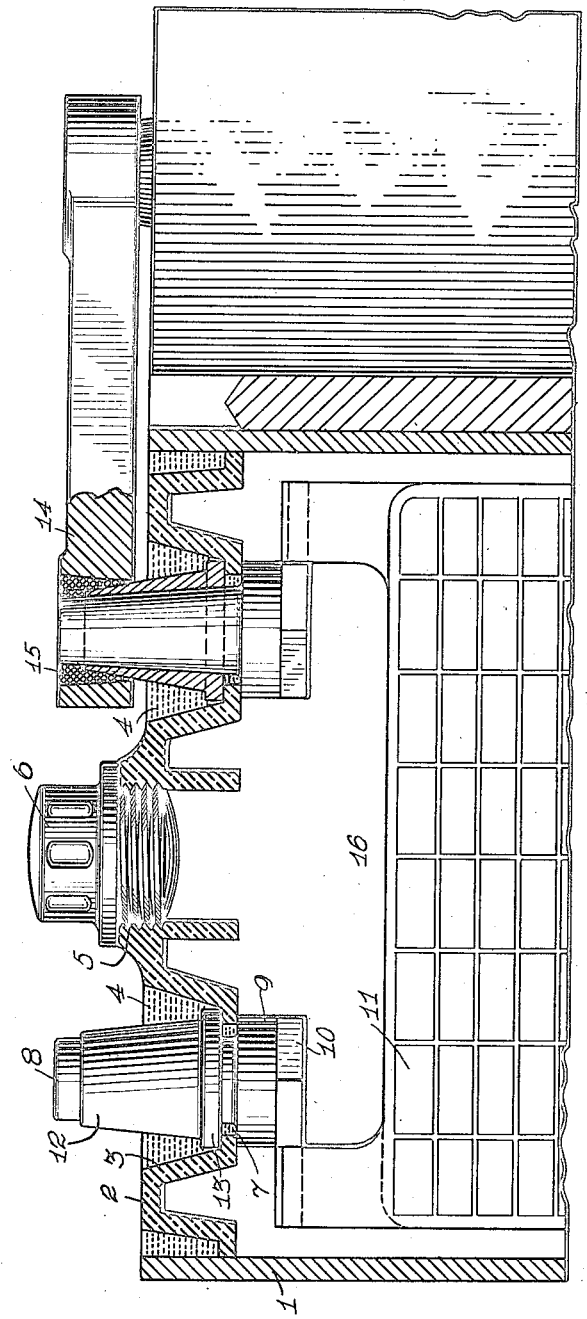
WITNESSES
H. S. Harwood
Robert J. Hulsizer
INVENTOR
Edgar A. Miller
BY
Munn & Co
ATTORNEYS Patented Oct. 31, 1922.

1,434,307

UNITED STATES PATENT OFFICE.

EDGAR A. MILLER, OF YOUNGSTOWN, OHIO.

BATTERY POST.

Application filed October 28, 1920. Serial No. 420,171.

*To all whom it may concern:*

Be it known that I, EDGAR A. MILLER, a citizen of the United States, and a resident of Youngstown, in the county of Mahoning and State of Ohio, have invented a new and Improved Battery Post, of which the following is a full, clear, and exact description.

This invention relates to a battery post, and has for an object to provide a battery post structure in which the vibration to which batteries used in commercial fields are subject will not affect the connection between the post and the battery container so as to cause leakage.

Another object resides in the provision of the particular arrangement of parts whereby the above-mentioned connection can be made in a very simple and economical manner. This particular arrangement will be hereinafter described and claimed and shown in the accompanying drawings.

In storage batteries, particularly those used in commercial fields, such as in the automobile industry, the constant jar to which the batteries are subject causes the connections around the battery post to work loose. This is due to the fact that the vibration causes the sealing material around the post to crack and permits the liquid within the battery container to leak out. Since this sealing material also acts as the means for holding the post in position, these posts work loose when the material cracks and affects the circuit to which the battery is connected. I provide a simple connection whereby, by the use of a simple sleeve of some soft metallic material, the battery post is firmly held in position on the cover of the battery, and any vibrations to which it may be subject are taken up by this connection rather than by the sealing and insulating material above mentioned.

The invention is illustrated in the drawing, of which—

The figure is a partial sectional view through the battery, particularly with respect to the cover portion thereof.

As shown in the drawing, the battery is contained within any suitable receptacle 1, which is preferably made of hard rubber. This container is adapted to be associated with a cover portion 2. This cover portion is provided with a plurality of tapered depressions 3 which, when the battery is completely assembled, are filled in with asphaltum material 4. The cover is also provided with a threaded aperture 5 adapted to receive a similarly threaded portion of a cap 6. Through the aperture 5 suitable liquid or electrolyte may be poured as desired. At the bottom of each depression 3 is an aperture 7 through which a battery post 8 is adapted to extend. This post 8 is provided on its inner face with a flange portion 9 adapted to bear against the inner face of the cover 2 adjacent the aperture 7. The ends 10 of the electrodes or plates 11 are fastened to the flanges 9 in any suitable manner. Preferably they are burnt or welded to the flange portion 9. As shown in the figure, all the positive plates would be connected, for instance, to the flange portion 9, shown in the left of the figure, whereas all the negative plates would be connected to the flange portion 9 shown on the right-hand side of the figure.

Disposed around the post 8 on the outside of the cover 2 is a sleeve portion 12 having an inner tapered bore adapted to be placed around the post 8, which is provided with a similar taper. The lower end of this sleeve is provided with a flange portion 13 adapted to rest on the outer face of the cover 2 adjacent and around the aperture 7.

After the plates have been welded or suitably connected to the posts 8 they are put into the battery container 1 and the cover is then placed over the posts. After this the sleeves 12 are slipped over the post and pressed downward on the post 8 to grip the cover 2 between the flanges 13 and the flange 9. By reason of the tapers on the post 8 and the sleeve 12 this grip is made effective in proportion to the pressure applied. The sleeve is then forced down on the post 8 and, at the same time, roll out the upper end by any suitable tool (not shown), as shown in the right-hand portion of the figure. This sleeve is made of some soft metal, such as lead, which can be easily rolled out thin.

Over the end of each post 8 and sleeve 12 a link 14 is placed having a suitable aperture 15 therein. This link is forced over the end of the post and sleeve and these units are then burnt or welded together. By reason of this action, the post, the sleeve and the link are held rigidly together and the sleeve is prevented from working loose from the post. By reason of the firm grip of the cover between the flanges 14 and 9 the post 8 is provided with a rigid bearing so that vibrations to which the battery may be subjected do not jar the post 8 loose.

The space 16 is the portion within the battery into which a suitable liquid electrolyte can be poured. This mechanical construction of the battery post permits a rigid clamping condition to exist between the post, the sleeve and the cover. After these units are assembled, as above described, a suitable asphaltum compound is poured in around them and over the top of the cover to make the whole assembly watertight.

What I claim is:

1. A battery structure comprising a cover having a tapered apertured depression therein, a post adapted to extend through said aperture, and a sleeve embracing the post along a substantial portion of its length and bearing against the cover and co-operating therewith to form a bearing for the post.

2. A battery structure comprising a cover having a tapered apertured depression therein, a post adapted to extend through the aperture, and a sleeve of soft metal extending along a substantial portion of the post and between the post and the cover and co-operating with the cover to form a bearing for the post.

3. A battery structure comprising a cover having an apertured depression therein, a post adapted to extend through said aperture, a sleeve of soft metal, and a flange on the inner end of said sleeve adapted to bear against a face of the cover, said sleeve embracing the post and co-operating with the cover to form a bearing for the post.

4. A battery structure comprising a cover having a tapered apertured depression therein, a sleeve of soft metal adapted to be positioned on one side of said aperture, said sleeve being provided with a tapered bore, a flange on the inner end of said sleeve adapted to bear against the outer face of the cover, a tapered post adapted to extend through the aperture and the sleeve, said sleeve lying along a substantial portion of the length of the post, and a flange on the inner end of the post adapted to bear against the inner face of the cover, said sleeve and post when pressed together adapted to grip the cover firmly therebetween.

EDGAR A. MILLER